US008543574B2

(12) United States Patent
Ke et al.

(10) Patent No.: US 8,543,574 B2
(45) Date of Patent: Sep. 24, 2013

(54) PARTIAL-MATCHING FOR WEB SEARCHES

(75) Inventors: Qifa Ke, Cupertino, CA (US); Michael Isard, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 12/479,164

(22) Filed: Jun. 5, 2009

(65) Prior Publication Data

US 2010/0312777 A1 Dec. 9, 2010

(51) Int. Cl.
*G06F 17/30* (2006.01)
*G06F 7/00* (2006.01)

(52) U.S. Cl.
USPC ..... 707/736; 707/758; 707/801; 707/E17.083

(58) Field of Classification Search
USPC .......................................... 707/736, 758, 801
See application file for complete search history.

(56) References Cited

U.S. PATENT DOCUMENTS

| | | | | |
|---|---|---|---|---|
| 5,734,340 | A | * | 3/1998 | Kennedy ......................... 341/59 |
| 5,761,655 | A | * | 6/1998 | Hoffman ............................... 1/1 |
| 6,546,383 | B1 | * | 4/2003 | Ogawa .................................. 1/1 |
| 7,356,528 | B1 | | 4/2008 | Amer-Yahia et al. |
| 7,428,528 | B1 | | 9/2008 | Ferrari et al. |
| 7,512,620 | B2 | | 3/2009 | Dingle |
| 2002/0069206 | A1 | * | 6/2002 | Bergman et al. .............. 707/100 |
| 2007/0106662 | A1 | | 5/2007 | Kimbrough et al. |
| 2008/0005064 | A1 | | 1/2008 | Sarukkai |
| 2008/0104246 | A1 | | 5/2008 | Katz et al. |
| 2008/0228750 | A1 | | 9/2008 | Zaragoza |
| 2008/0306968 | A1 | | 12/2008 | Nandhra |
| 2009/0089278 | A1 | | 4/2009 | Poola et al. |
| 2009/0094212 | A1 | | 4/2009 | Zaccagnino |

OTHER PUBLICATIONS

Zhang, et al., "Personalized Web Prefetching in Mozilla", Technical Report LU-CSE-03-006, Department of Computer Science and Engineering, Lehigh University, Bethlehem, PA, 2003, http://citeseerx.ist.psu.edu/viewdoc/summary?doi=10.1.1.131.4663.
Palpanas, Themistoklis, "Web Prefetching Using Partial Match Prediction", 1998, https://tspace.library.utoronto.ca/bitstream/1807/15673/1/MQ40748.pdf.

(Continued)

*Primary Examiner* — Charles Kim
*Assistant Examiner* — Miranda Huang
(74) *Attorney, Agent, or Firm* — Microsoft Corporation

(57) ABSTRACT

An efficient manner of performing an M-out-of-N partial matching search of indexed documents (e.g., web pages) is provided herein. More particularly, indexed words are arranged into a global location space (GLS), providing for respective occurrences of words in indexed documents being searched to have continuous locations on a one-dimensional GLS. Documents within the GLS are separated by end of document word marking boundaries between consecutive documents. The query words are then separated into an active set, comprising the left-most query words, and a non-active set. A partial matching operator transverses the GLS, applying active geometric constraints, in a sequential manner, to words in the active set. This causes shifting of the active set along the GLS to comprise M left-most query words. If a document satisfies constraints associated with M words in an active set, the document comprises at least M-out-of-N words.

20 Claims, 8 Drawing Sheets

(56) References Cited

OTHER PUBLICATIONS

Nakauchi et al., "Peer-to-Peer Keyword Search Using Keyword Relationship", http://simple-project.org/publications/2003/nakauchi-gp2pc03.pdf.

Ford et al., "Pattern Matching Techniques for Correcting Low Confidence OCR Words in a Known Context", National Library of Medicine, Bethesda, Maryland 20894, http://mdot.nlm.nih.gov/pubs/ford/spie01/spie01exab.pdf, Sep. 30, 2006.

Joo et al., "An Effective Searching Method Using the Example-Based Query", G. Chakraborty (Ed.): ICDCIT 2005, LNCS 3816, pp. 255-266, 2005, http://www.springerlink.com/content/y2n717295217841n/fulltext.pdf.

"Peer-to-Peer Keyword Search Using Keyword Relationship", Kiyohide Nakauchi, Yuichi Ishikawa, Hiroyuki Morikawa and Tomonori Aoyama, Cluster Computing and the Grid, Proceedings: CCGrid 2003, 3rd IEEE/ACH International Symposium, May 12-15, 2003, pp. 359-366.

\* cited by examiner

PARTIAL-MATCHING FOR WEB SEARCHES

BACKGROUND

The internet has large amounts of data distributed over a multitude of computers, thereby providing users with massive quantities of information on varying topics. This is also true for a number of other communication networks, such as intranets and extranets. Finding specific information from such large amounts of data can be difficult.

Search engines have been developed to address the problem of finding specific information on large networks. For example, a user can enter one or more search terms into a search engine and the search engine will return a list of network locations (e.g., uniform resource locators (URLs)) that the search engine has determined contain relevant information.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Among other things, a highly efficient manner of performing an M-out-of-N partial matching search (e.g., a search that returns documents having at least M out of N query terms, wherein $M \leq N$) of indexed documents (e.g., web pages, image files, etc.) is provided herein. More particularly, indexed words (e.g., comprised within the documents) are arranged into a global location space (GLS) which allows a partial matching operator to move through the words in the GLS and efficiently find documents comprising at least M words of an N-word query by applying geometric constraints to the words in a sequential manner.

In one example, an M-out-of-N partial matching search is configured to provide results in a highly efficient manner. The method arranges indexed words into a one-dimensional global location space (GLS). The GLS allows respective occurrences of words in indexed documents, that are being searched, to be assigned to continuous locations on the one-dimensional GLS. Documents (e.g., comprising the words) within the GLS are delineated by an end of document (EOD) word marking the boundaries between consecutive documents. Query words are then separated into an active set, initialized to comprise the left-most query terms (e.g., words in the query with the left-most locations in the one-dimensional GLS) and a non-active set. A partial matching operator traverses the GLS, applying active geometric constraints, in a sequential manner, to words in the active set (e.g., applying geometric constraints to words sorted by their estimated landing locations in the GLS). As the partial matching operator traverses the GLS, the active set will shift to comprise the M left-most query words which have not failed the active geometric constraints. If a document satisfies active geometric constraints associated with M words in an active set, the document comprises at least M-out-of-N words and is returned to a user. If the document does not satisfy the active geometric constraints, the partial matching operator proceeds along the GLS. This search method provides for a highly efficient partial search that reduces the computational load, thereby providing for faster search results and improved data retrieval capabilities.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
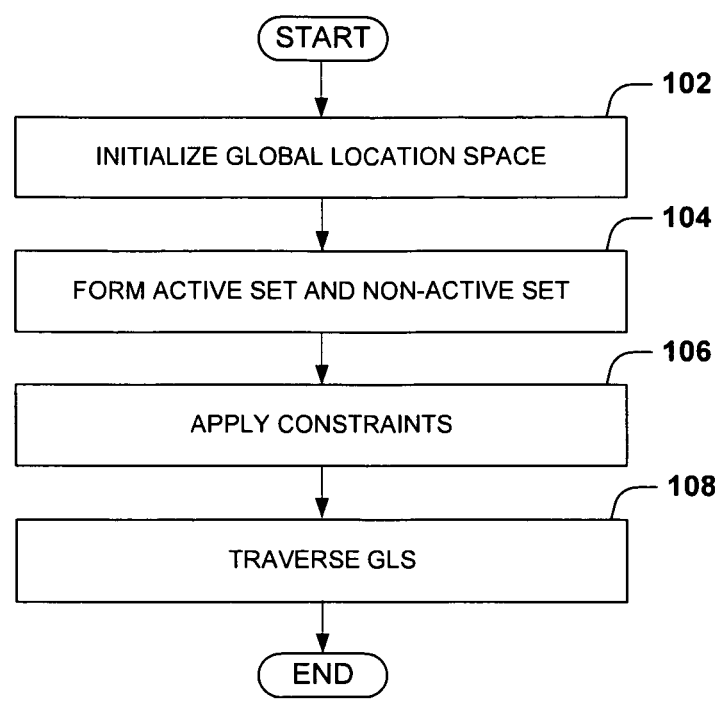
FIG. 1 illustrates a flow chart illustrating an exemplary method for efficiently searching partial matches of queries.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

Searching images on the web can be done in a manner that is analogous to text searching, wherein features of an image are described in a manner that is analogous to text words. For example, for a given image, query browsers can look for features in an image and return all images having these visual features in them, essentially transforming image queries into text queries.

Partial matching (e.g., finding documents which contain only some of the terms of a web query) is often used with such image searching since the number of visual features in a query may be too large to return complete matching queries (e.g., finding documents which contain all of the terms of a web query). Unfortunately, partial matching of web queries becomes very challenging and computationally demanding for long queries (e.g., queries comprising many terms). For example, an existing solution for performing a partial matching, comprising checking documents that contain at least one word of query is inefficient. Similarly, requiring a match of all of the partial combinations, becomes extremely computationally demanding and is not feasible for large queries. Accordingly, a method of partial matching is described herein which offers a highly efficient manner of performing a partial matching search.

Among other things, one or more methods and/or systems of performing an efficient M-out-of-N partial matching search (e.g., a search that returns documents having at least M out of N query terms, wherein $M \leq N$) of indexed documents (e.g., web pages, image files, etc.) are provided herein. More particularly, indexed words (e.g., comprised within the documents) are arranged into a global location space (GLS) which allows a partial matching operator to move through the words in the GLS monotonically in a single pass and efficiently find documents comprising at least M words of an N word query by applying geometric constraints to the words in a sequential manner.

In one example, illustrated in FIG. 1, an M-out-of-N partial matching search is configured to provide results in a highly efficient manner. In this example, an inverted index (e.g., usually constructed before query time) uses a global location space (GLS) to identify the occurrence of words in indexed documents. It will be appreciated that an approach described herein can also be applied to one or more other inverted index formats. The GLS allows respective occurrences of words in indexed documents, that are being searched, to be assigned to continuous locations (e.g., a 64-bit integer) on the one-dimensional GLS. Documents (e.g., comprising the words) within the GLS are delineated by an end of document (EOD) word marking the boundaries between consecutive documents. Note that inverted index file is usually, but need not always be, constructed before query time.

At 102 the method initializes a global location space (GLS) by assigning indexed words appearing in the query into a one-dimensional GLS. In other words, respective query words are initially placed in landing locations (e.g., locations in the GLS) that are equal to the location of their first appearances in the the inverted index (e.g., the inverted index hit-list).

The query words are then separated into an active set and a non-active set at 104. The active set is initialized to comprise the left-most query terms (e.g., initialization assigns words in the query, with the left-most location to the one-dimensional GLS) and a non-active set.

At 106 geometric constraints are applied to respective words in the GLS. If a document satisfies active geometric constraints (e.g., geometric constraints applied to query words in the active set) associated with M words in an active set, the document comprises M-out-of-N words and is returned to a user. If the document does not satisfy the active geometric constraints, the partial matching operator proceeds along the GLS.

The GLS is traversed at 108. In traversing the GLS, active geometric constraints are applied, in a sequential manner, to words in the active set. In other words, in traversing the GLS, active geometric constraints are applied to words in an order sorted by their target landing locations in the GLS (e.g., the location a word will be if its associated constraints are satisfied). As the partial matching operator traverses the GLS, the active set will shift to comprise the M left-most query words. This search method provides for a highly efficient partial search that reduces the computational load, thereby providing for faster search results and improved data retrieval capabilities.

In other words, when the GLS is traversed, respective query words failing to satisfy the geometric constraints are moved to a new location in the GLS (e.g., in the word's associated files hit-list) in order to satisfy the geometric constraints. This may cause the moved query word to be swapped with a left-most query word in the non-active set, for example, if the moved word has a current location larger than that of left-most query word.

The one or more methods and/or systems provided herein may be configured to search for query terms located in documents comprised within an index file, for example. Index files are typically maintained in relation to search engines so that search results can be quickly obtained from aggregated data located at a single location. It will also be appreciated that the one or more methods and/or systems provided herein may use alternative types of index files (e.g., other inverted index file formats, one or more inverted index files, etc.) and that the inverted index file set forth below is intended as a non-limiting example. That is, the disclosure herein is not meant to be limited to/by the particular examples illustrated.

Figures 2, 4:
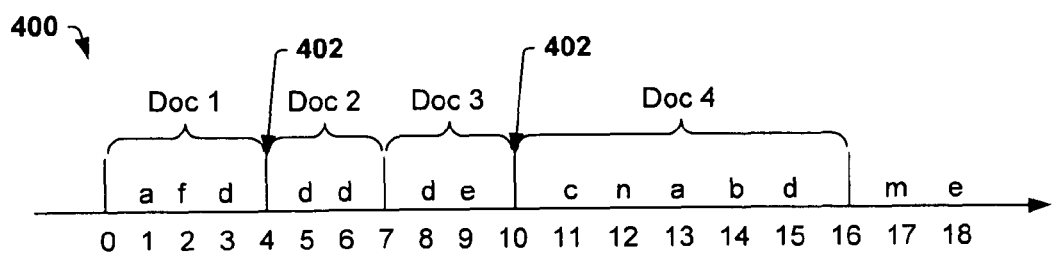
FIG. 2 illustrates an exemplary document list and an inverted index file.
FIG. 4 illustrates an exemplary diagram of a global location space (GLS).

Accordingly, FIG. 2 illustrates an exemplary document list 200 and an inverted index file 202 that will be used in conjunction with FIGS. 3-7 to aid in understanding. As illustrated in FIG. 2, the document list 200 comprises a list of the documents (Doc 1, Doc 2, etc.) along with the words that are comprised within respective documents. For example, Doc 1 comprises the words "a", "f", and "d". Doc 2 comprises the words "d" and "d".

The inverted index file 202 may comprise concatenated data from the document list 200 (e.g., webpage content). More particularly, the inverted index may comprise a location (e.g., an integer) of respective occurrences of words in the document(s) being indexed. In regards to the present technology, the inverted index may be thought of as containing the locations of the GLS (e.g., respective words in the index file are followed by locations of GLS). In other words, the indexed words are assigned locations in the GLS.

As shown in FIG. 2, the inverted index file 202 comprises words and associated hit-lists 204, wherein the hit-lists 204 comprise the location of words in the document list 200. For example, the word "a" has a hit-list 204 comprising locations 1 and 13, meaning that the word "a" can be found at location 1 (e.g., in document 1) and at location 13 (e.g., in document 4). The inverted index file may reside in memory or on disk which can be accessed by a dynamic program configured to interact with a search engine, for example.

Figure 3:
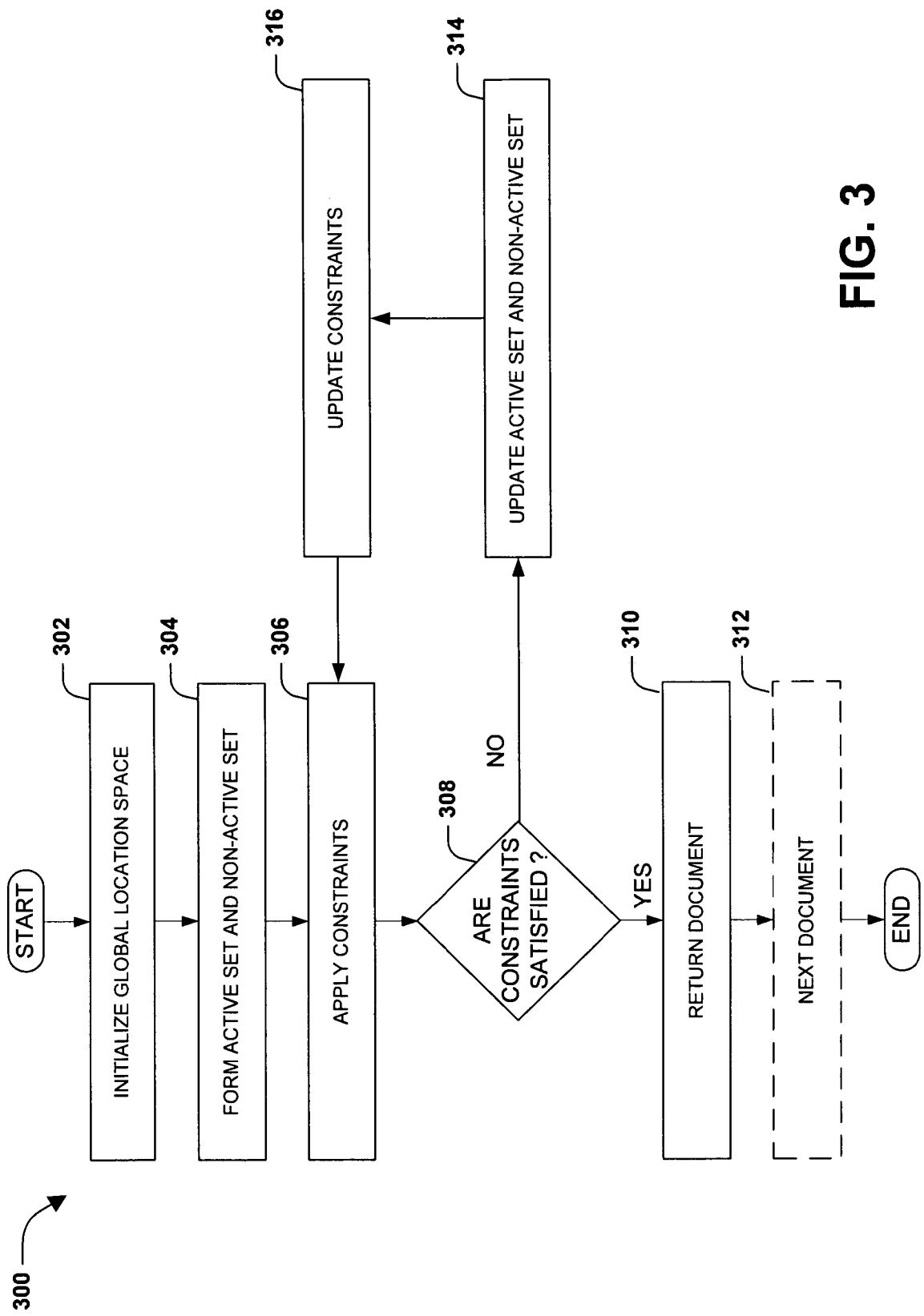
FIG. 3 illustrates a more detailed flow chart illustrating an exemplary method for efficiently searching partial matches of queries.

FIG. 3 illustrates a flow chart of a more detailed exemplary method 300 for efficiently searching partial matches of queries. More particularly, exemplary method 300 relates to partial matching search that utilizes indexed documents having words that have been assigned to locations in a global location space (GLS). At query time, query words are assigned to GLS locations and are separated into active and non-active sets which allow a partial matching operator to move through the words and efficiently find documents comprising M words of an N-term query by applying geometric constraints, in a sequential manner, to words comprised within the active set.

At 302 a global location space is initialized. During initialization, respective query words are placed in the global location space (GLS) at the location (e.g., denoted by integer numbers) of its first appearance in the inverted index (e.g., during initialization query words are put into an initial location equal to the left-most position or first location of a query word's hit list). The GLS is a one-dimensional flat space (e.g., a linear space) that comprises indexed documents and words. Having words configured in a one-dimensional GLS enables algorithms (e.g., a partial matching operator) to more easily identify the occurrence of query terms in indexed documents by simply enforcing geometric constraints while traversing the GLS.

FIG. 4 illustrates an example of a global location space (GLS). As shown in FIG. 4, respective words of an index file (e.g., inverted index file 202) are assigned a location in the GLS in a continuous manner. For example, the word "a" is assigned to locations 1 and 13 in the GLS, the word "b" is assigned to location 14, etc. Different documents are delineated by inserting one or more end of document (EOD) words 402, which mark the boundaries between two consecutive documents. A document comprises the words between two EOD words. For example, as illustrated in FIG. 4, Doc 1, comprising words "a", "f", and "d", is located between the EOD word at location 0 and the EOD word at location 4 in the GLS.

At 304 the query words assigned to the GLS are split into an active set and a non-active set. Initially, the active set may comprise a subset (e.g., M out of N) of query terms (e.g., that are the left-most terms on an index file's hit-list and spatially on the GLS). The non-active set may comprise the query terms not in the active set. Separation of the words assigned to the GLS into active and non-active sets allows for more efficient searching. For example, words in the active set can be searched (e.g., constraints can be applied to words in the active set), while words in the non-active set can be ignored. For an M-out-of-N partial matching search (e.g., a partial matching search that returns documents matching M terms out of an N term query) the active sets may comprise the current M left-most query words on the GLS and the EOD word, while the non-active set may comprise the rest of the N-M query words.

For example, for a query having words {a, b, c, d, e} in a 4-out-of-5 partial matching search, the active set would comprise the current four left-most query words (e.g., the 4 left-most appearing words of either "a", "b", "c", "d", or "e" on the GLS), while the non-active set would comprise the rest of the query words. In the GLS of FIG. 4, it can be seen that the 4 left-most query words comprise "a" (e.g., in location 1), "d" (e.g., in location 3), "e" (e.g., in location 9), and "c" (e.g., in location 11). The non-active set, comprising the rest of the query word (e.g., N-M words) comprises "b" (e.g., does not appear until location 14).

At 306 one or more geometric constraints are applied to words in the active set. The geometric constraints may determine if words in the active set are comprised within a single document. For example, geometric constraints can be applied to respective words within the active set, thereby determining if the words in the active set are comprised within a document. If the words in an active set are comprised within a document, the document is returned as a partial matching document. More particularly, geometric constraints can be applied to words in the active set in a sequential manner such that looking at only words in an active set (e.g., the M left-most words) allows for a complete search.

If all words in the active set satisfy the geometric constraints then the document is returned as a partial matching document at 310. For example, if all of the words in the active set are found to be comprised within a single document then the document is a partial matching document. In one example, if a document meets 2M constraints (e.g., two constraints for every M word in the active set), the document meets an M-out-of-N partial matching search criteria (e.g., the locations of the active words are inside a document's boundaries in the GLS).

The method can then move to a next document at 312. The method can move from small numeric locations (e.g., 0) to large numeric locations (e.g., 15) of the GLS in search of the next document to meet active constraints. It will be appreciated that the method of partial matching shown in FIG. 3 can be continuously performed until the entire GLS is traversed.

If some words in the active set do not satisfy the geometric constraints, then the active set and non-active set are updated at 314. For example, if words in the active set are not found within a single document then the active and non-active sets may be updated.

Updating the active and non-active set may result in word of the active set continuously changing as the GLS is traversed (e.g., geometric constraints are applied while moving rightward from location 0). For example, if a word in the active set fails an active geometric constraint, that word location may be removed from the active set and replaced with the next occurrence of that word in the GLS (e.g., the next location of that word in the hit-list 204) or with a word from the non-active set.

A word from the active set that fails to satisfy the geometric constraints can be moved to a next position on its hit-list outside of the active set, for example. Since this reduces the number of elements in the active set (e.g., to M−1 elements) the active set expands along the GLS to include the M left-most elements (e.g., the active set may also expand to include a word from the non-active set). For example, if the word "e" in location 9 fails to meet the geometric constraints the partial matching operators moves to the next instance of "e" on its hit-list, at location 18. To compensate the for the loss of the word "e" from the active set (e.g., resulting in M−1 left-most elements) the active set expands to include "d" (e.g., resulting once again in M left-most elements of the query {a, b, c, d, e}).

At 316 the geometric constraints are then updated and reapplied to the updated active set. The geometric constraints are updated so that they can be applied to the words in the active set. For example, the geometric constraints may be updated to account for a word that has been introduced into the active set and/or a word that has been removed from the active set.

In one example, prior knowledge of a query can be used to increase the speed of the partial matching search. For example, if the occurrence frequency of respective query words is known, the constraints may be satisfied by inducing rare words first. Alternatively, if some query words are to appear in a document in order for it to be returned as query results, the constrains induced by those words can be satisfied first, for example.

Figure 5:
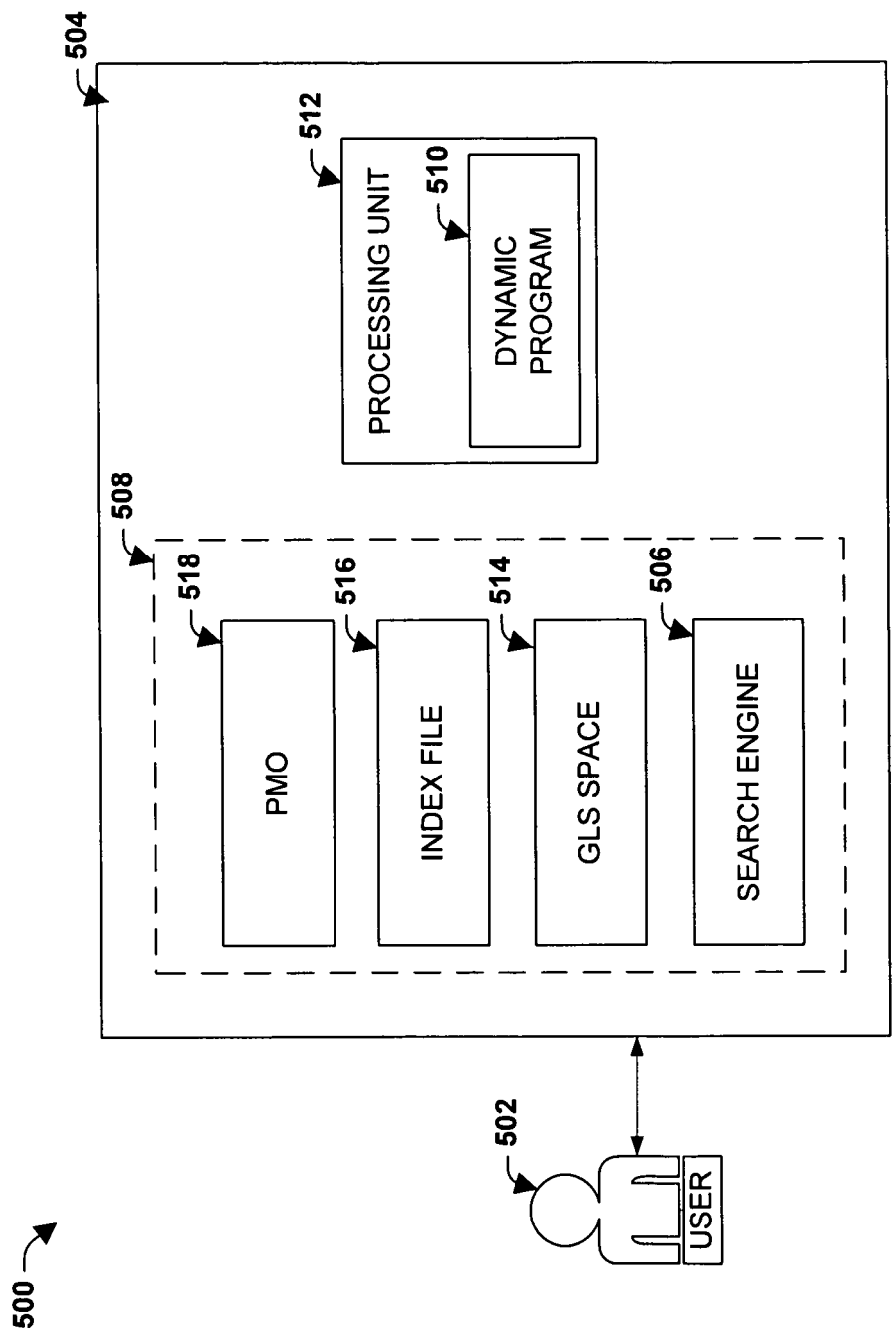
FIG. 5 illustrates a block diagram of a computer system configured to perform a partial matching search, as provided herein.

FIG. 5 illustrates a block diagram 500 of a system configured to improve the efficiency of partial matching web searches for a multi-term query. As illustrated in FIG. 5, a user 502 interacts with the computer system 504 (e.g., server) by way of a search engine 506. The search engine 506 may be stored in storage location 508 (e.g., memory) and accessed by way of a dynamic program 510 run by a processing unit 512. The search engine 506 may be configured to receive a query from the user 502.

The dynamic program 510 may utilize a global location space (GLS) 514 stored in the storage location 508 (e.g., the storage location 508 may comprise one or more separate storage locations). The global location space comprises words from an index file 516 (e.g., as illustrated in FIG. 2), wherein respective words within the one-dimensional global location space (GLS) 514 may be continuously arranged in locations and wherein documents comprising the one or more words are delineated by one or more end of document (EOD) words.

The dynamic program 510 may be configured to operate a partial matching operator 518 (PMO) on the GLS 514. The partial matching operator 518 separates query words in the GLS 514 into an active set and a non-active set based upon the received query's terms. The active set may comprise the M left-most words of the index file's hit-list appearing in the received query. The non-active set may comprise the remaining N-M left-most words of the index file's hit-list appearing in the received query.

The partial matching operator (PMO) 518 keeps track of M words in the active set and their active geometric constraints. The dynamic program 510 is configured to apply the geometric constraints to words comprised within the active set. The partial matching operator 518 can move along the GLS 514 in a way such that documents with less than M common words can be mostly skipped. If the words of a document satisfy the geometric constraints the document is a partial matching document and is returned to the user 502.

Figure 6:
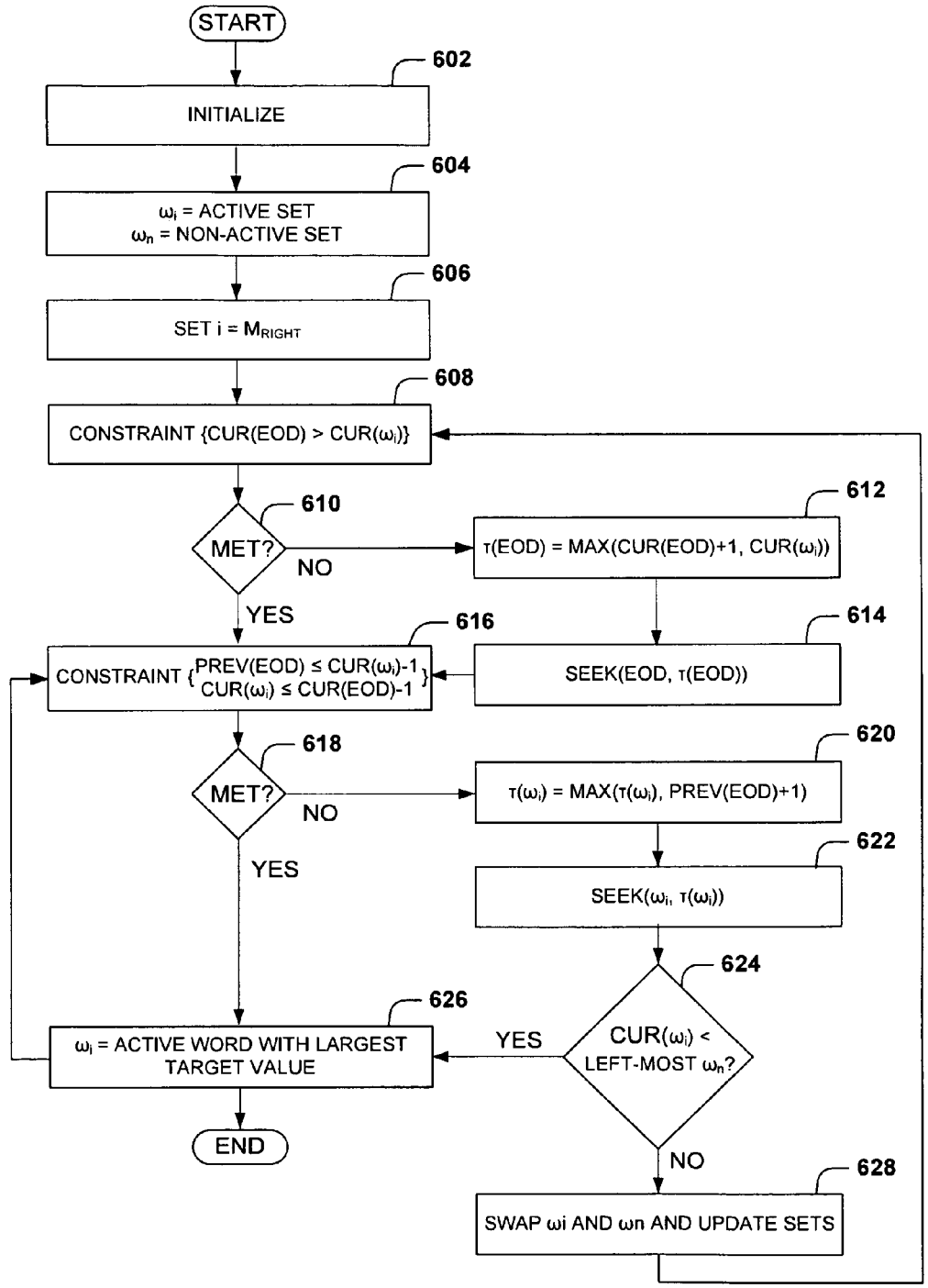
FIG. 6 illustrates a flow diagram of a detailed example of a partial matching search.
Figure 7:
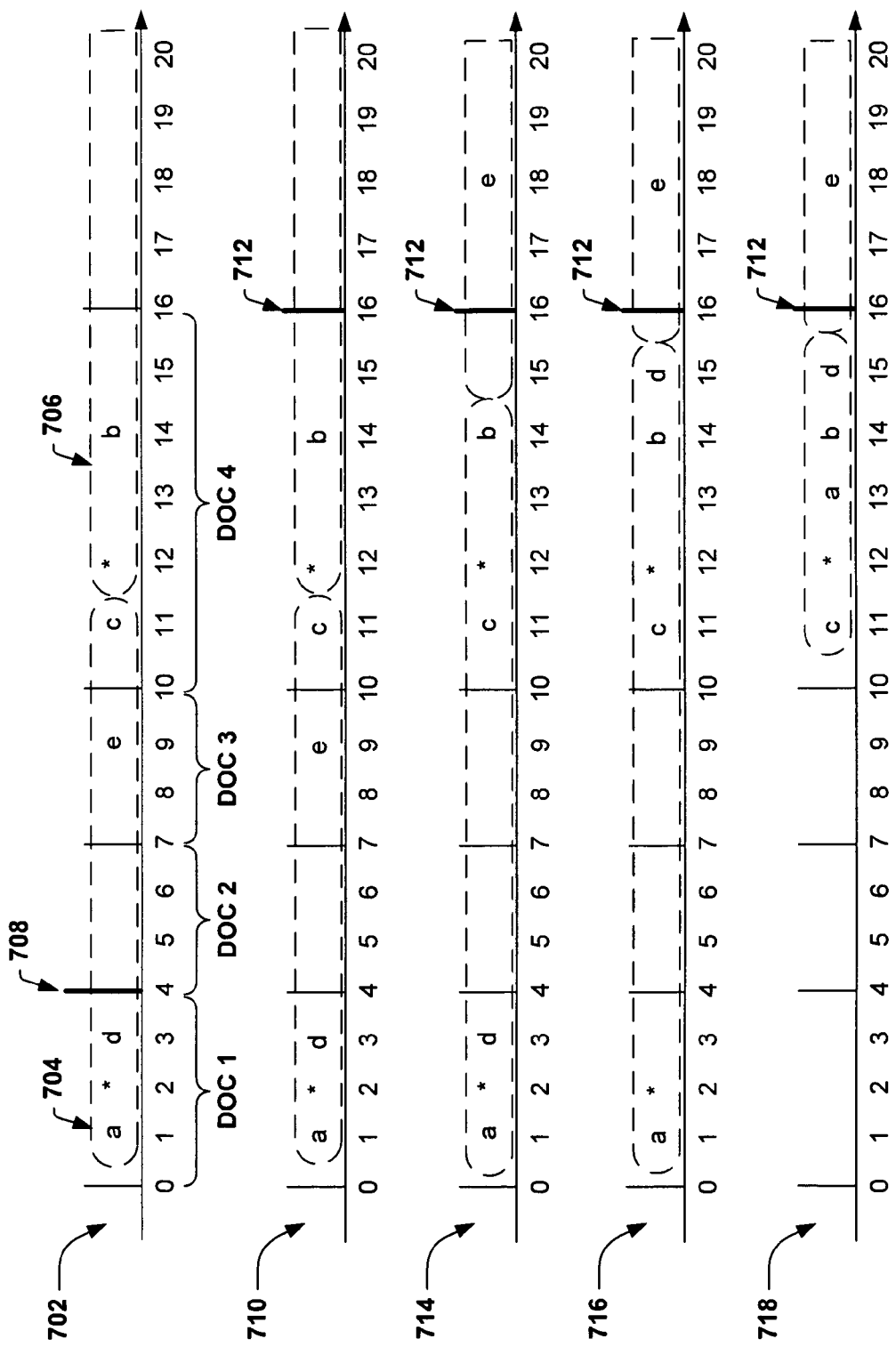
FIG. 7 illustrates exemplary GLS showing words comprised within an active and a non-active set.

FIG. 6 illustrates a flow diagram of a detailed example of a method for performing an efficient partial matching search, as provided herein, for a query {a, b, c, d, e}. FIG. 7 illustrates an example of the words comprised within an active and a non-active set in global location space (GLS) at various points in the method of FIG. 6.

The GLS is initialized at 602. FIG. 7 illustrates an initialized GLS 702 for a 4-out-of-5 partial matching search (e.g., an M-out-of-N search query, wherein M≦N). Indexed words are comprised at continuous locations along the GLS, though only the query words are shown in FIG. 7. End of Document (EOD) words are comprised within the GLS 702 and are configured to delineate documents. For example, Doc 1 and Doc 2 are separated by EOD word 708 (e.g., in other words, EOD word 708 denotes the end of Doc 1 and the beginning of Doc 2).

At 604 the query words in GLS are separated into an active set and a non-active set. For example, as illustrated in FIG. 7, the active set 704 comprises terms "a", "d", "e", and "c" (e.g., respectively located at locations 1, 3, 9, 11) and the non-active set 706 comprises the word "b" (e.g., a word at location 14).

At 608 a constraint is applied to an active EOD word. The constraint provides that the location of the active EOD word (e.g., the EOD word in the active set) is to the right of the location of the right-most word in the active set in the GLS:

$$CUR(EOD) > CUR(\omega_i)$$

wherein $\omega_i$ is the right-most word of the active set (e.g., set at action 606) and CUR(x) returns the current location of the word x. This constraint provides that the active EOD word is located at a position which makes it possible for a document to comprise M terms of the active set. For example, in FIG. 7, if the active EOD were not located right of the word "c" (e.g., the right-most word in the active set), then the document could not comprise M terms (e.g., since the document could not comprise either the word "c" or "d").

If the constraint is met and the active EOD word has a location greater than right-most word of the active set in GLS, the method may proceed past decision box 610 to 616. However, if the constraint is not met than the active EOD word may be moved rightward at 612-614.

At 612 a target value is determined. The target value is a location above which the active EOD word can be moved to satisfy the constraint. As shown in the example of FIG. 6, the target value ($\tau$(EOD)) of the active EOD word may be equal to the maximum of either the current location of the active EOD word plus one or the current location of the right-most word of the active set:

$$\tau(EOD) = MAX(CUR(EOD)+1, CUR(\omega_i))$$

wherein MAX(x,y) returns the maximum value of x or y.

The target value may be incorporated into a seek function at 614. The seek function will move the position of the active EOD to a location past the target value in the GLS (e.g., SEEK($\omega$,t) will seek the word $\omega$ to a location, l, such that l≧t). For example, in FIG. 7, GLS 710 illustrates the active EOD word moved from the EOD word 708 at location 4 to the EOD word 712 at location 16. Therefore, the active EOD is moved to the right of the active set in the GLS, successfully skipping documents which are not partial matches without missing possible matching documents.

At 616 one or more geometric constraints are applied to a current word ($\omega_i$) in the active set. In one example, the geometric constraints may comprise constraints that the current word ($\omega_i$) have a larger location than the immediate previous EOD and that the current word ($\omega_i$) have a smaller location than the current EOD:

$$PREV(EOD) \leq CUR(\omega_i) - 1$$

$$CUR(\omega_i) \leq CUR(EOD) - 1$$

wherein $\omega_i$ is a current word in the active set, PREV(EOD) returns the immediate previous location of the active EOD in the GLS, and CUR(x) returns the current location of x (e.g., where x is the active EOD or $\omega_i$). Therefore, these geometric constraints provide that a current word in the active set is within a current document (e.g., between PREV (EOD) and CUR(EOD)).

If the current word in the active set satisfies the geometric constraints the method may proceed through decision box 618 to 628, wherein the words in the active set are sorted by their estimated target landing locations (e.g., the location a word will be if its associated constraints are to be satisfied) in the GLS. In this manner the geometric constraints can be applied to respective words within the active set in a descending order according to their target landing locations in GLS (e.g., from a right to left direction in the GLS illustrated herein). This provides for application of the geometric constraints based on their statistical commonality. In one example, geometric constraints are applied to the statistically least common words prior to statistically more common words (e.g., a word with the furthest estimate landing location in the GLS can be statistically the least common word since it takes the longest to appear in the GLS).

If the geometric constraints (e.g., 2M geometric constraints) are satisfied by the words in the active set, then the document is returned as a positive search result and the partial matching operator moves to the next document.

The two geometric constraints corresponding to respective words can be applied to a global location space such that finding an M-out-of-N partial matching is equivalent to finding a document that satisfies 2M geometric constraints out of the 2N induced geometric constraints. If the geometric constraints are not satisfied by the words in the active set, then the active set is modified (e.g., as provided in elements 620-630).

At 620 a target value is determined. The target value ($\tau(\omega_i)$) is a location above which the current word $\omega_i$ may be moved to satisfy the geometric constraints. As shown in the example of FIG. 6, the target value of the word $\omega_i$ may be equal to the maximum of either its current target value or the immediate previous location of the EOD plus one:

$$\tau(\omega_i) \leftarrow MAX(\tau(\omega_i), PREV(EOD)+1)$$

wherein PREV(x) returns the immediate previous location of x.

The target value is incorporated into a seek function at 622. The seek function will move the position of the current word $\omega_i$ to a location past the target value in the GLS. For example, in FIG. 7, GLS 714 illustrates word "e" moved from location 9 to location 18. When this occurs the word "e" is moved beyond the right-most word in the active set (e.g., c) and it is added to non-active word set. The left-most word "b" from the non-active set is removed and then added back to the active word set.

If the current active word $\omega_i$ is moved to the right of the location of the left-most non-active word $\omega_n$, then $\omega_i$ and $\omega_n$ are swapped between the active set and the non-active set at 630. Referring again to FIG. 7, in GLS 714 the updated location of the current word "e" is to the right of "b" (the left-most word in the non-active set). Therefore "e" and "b" are swapped and the active set 704 and non-active set 706 are updated.

The method proceeds to cycle through actions 608-630 until a partial matching document is returned (e.g., a document having words satisfying 2M geometric constraints). By doing so, all documents containing at least M query words will be returned, and documents contain less than M query words will be skipped. This allows the search algorithm to skip documents containing less than M matching words and return partial matching documents in a highly efficient manner.

For example, in FIG. 7, GLS 714 and 716 illustrate this process. In GLS 714 the word "d" (in location 3) fails to satisfy the constraints (e.g., action 616) and is accordingly moved to its next location (location 15) on the hit-list that is greater than the location of PREV(EOD) (e.g., action 620), where it satisfies the constraint CUR($\omega_i$)>PREV(EOD).

Similarly, GLS 718 illustrates word "a" fails to satisfy the constraints (e.g., action 616) and is accordingly moved to its next location (location 13), by way of actions 620-628.

Once "a" is moved to location 13, DOC 4 satisfies 2M geometric constraints signifying that the document (e.g., between location 10 and 16) contains at least M query words.

Figure 8:
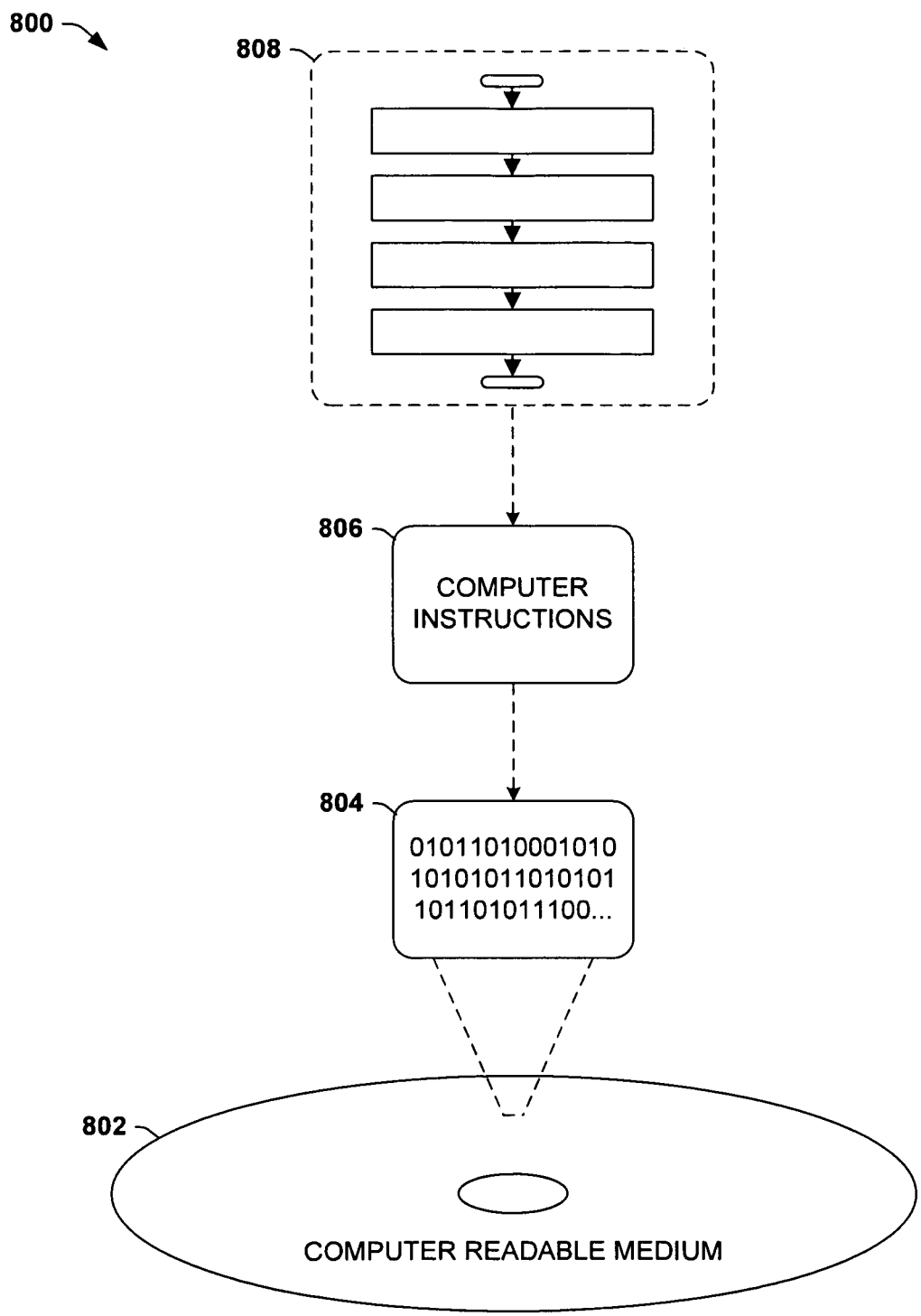
FIG. 8 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 8, wherein the implementation 800 comprises a computer-readable medium 816 (e.g., a CD-R, DVD-R, or a platter of a hard disk drive), on which is encoded computer-readable data 810. This computer-readable data 810 in turn comprises a set of computer instructions 812 configured to operate according to one or more of the principles set forth herein. In one such embodiment 800, the processor-executable instructions 814 may be configured to perform a method, such as the exemplary method 100 of FIG. 1, for example. In another such embodiment, the processor-executable instructions 814 may be configured to implement a system, such as the exemplary system 500 of FIG. 5, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 9:
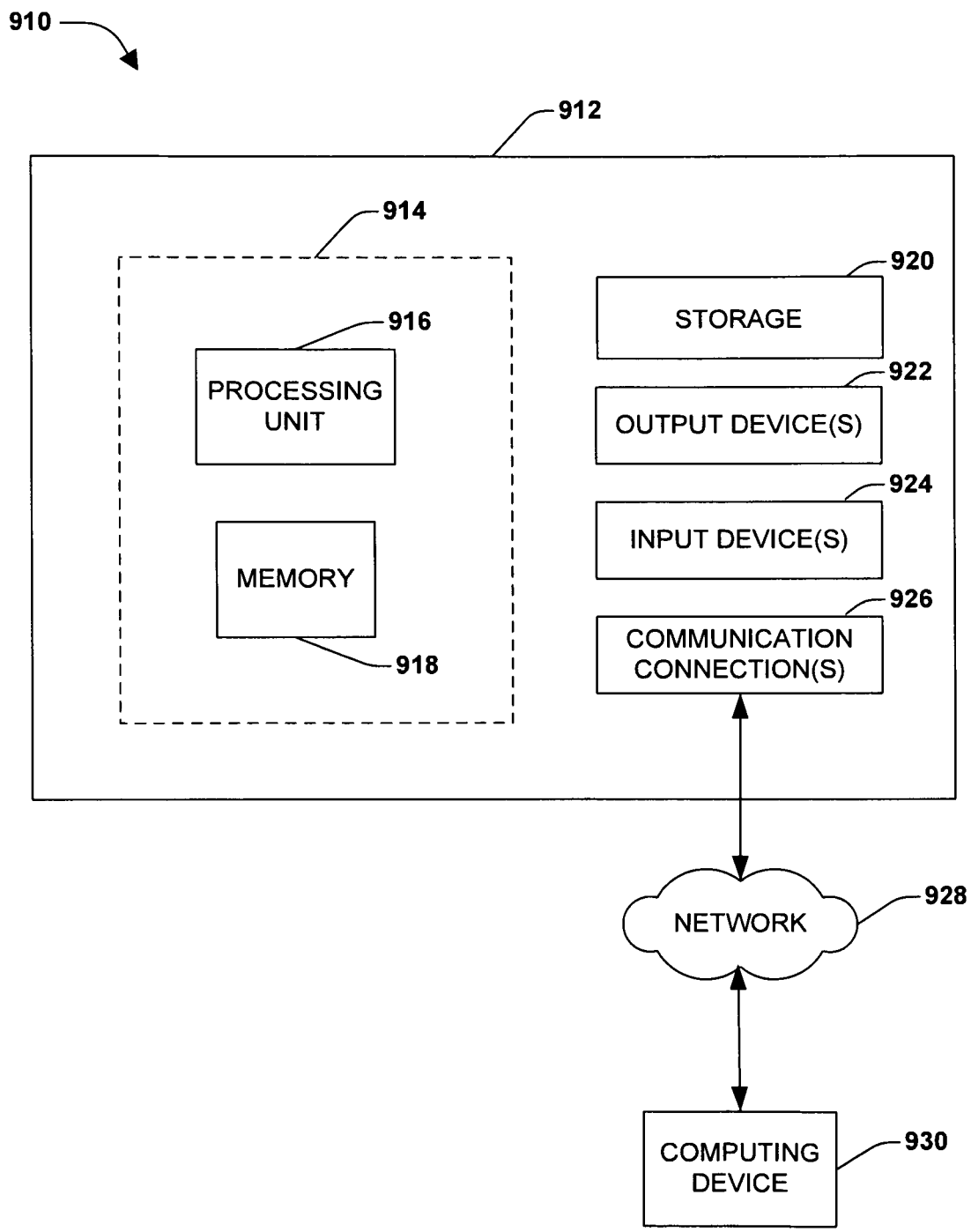
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 910 comprising a computing device 912 configured to implement one or more embodiments provided herein. In one configuration, computing device 912 includes at least one processing unit 916 and memory 918. Depending on the exact configuration and type of computing device, memory 918 may be volatile (such as RAM, for example), non-volatile (such as ROM, flash memory, etc., for example) or some combination of the two. This configuration is illustrated in FIG. 9 by dashed line 914.

In other embodiments, device 912 may include additional features and/or functionality. For example, device 912 may also include additional storage (e.g., removable and/or non-removable) including, but not limited to, magnetic storage, optical storage, and the like. Such additional storage is illustrated in FIG. 9 by storage 920. In one embodiment, computer readable instructions to implement one or more embodiments provided herein may be in storage 920. Storage 920 may also store other computer readable instructions to implement an operating system, an application program, and the like. Computer readable instructions may be loaded in memory 918 for execution by processing unit 916, for example.

The term "computer readable media" as used herein includes computer storage media. Computer storage media includes volatile and nonvolatile, removable and non-removable media implemented in any method or technology for storage of information such as computer readable instructions or other data. Memory 918 and storage 920 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 912. Any such computer storage media may be part of device 912.

Device 912 may also include communication connection(s) 926 that allows device 912 to communicate with other devices. Communication connection(s) 926 may include, but is not limited to, a modem, a Network Interface Card (NIC), an integrated network interface, a radio frequency transmitter/receiver, an infrared port, a USB connection, or other interfaces for connecting computing device 912 to other computing devices. Communication connection(s) 926 may include a wired connection or a wireless connection. Communication connection(s) 926 may transmit and/or receive communication media.

The term "computer readable media" may include communication media. Communication media typically embodies computer readable instructions or other data in a "modulated data signal" such as a carrier wave or other transport component and includes any information delivery media. The term "modulated data signal" may include a signal that has one or more of its characteristics set or changed in such a manner as to encode information in the signal.

Device 912 may include input device(s) 924 such as keyboard, mouse, pen, voice input device, touch input device, infrared cameras, video input devices, and/or any other input device. Output device(s) 922 such as one or more displays, speakers, printers, and/or any other output device may also be included in device 912. Input device(s) 924 and output device(s) 922 may be connected to device 912 via a wired connection, wireless connection, or any combination thereof. In one embodiment, an input device or an output device from another computing device may be used as input device(s) 924 or output device(s) 922 for computing device 912.

Components of computing device 912 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 912 may be interconnected by a network. For example, memory 918 may be comprised of multiple physical memory units located in different physical locations interconnected by a network.

Those skilled in the art will realize that storage devices utilized to store computer readable instructions may be distributed across a network. For example, a computing device 930 accessible via network 928 may store computer readable instructions to implement one or more embodiments provided herein. Computing device 912 may access computing device 930 and download a part or all of the computer readable instructions for execution. Alternatively, computing device 912 may download pieces of the computer readable instructions, as needed, or some instructions may be executed at computing device 912 and some at computing device 930.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for providing an M out of N partial matching search, comprising:

initializing a global location space (GLS) by assigning respective occurrences of words to continuous locations of a one-dimensional array comprised within the GLS, wherein the words are from one or more documents indexed for searching, the one or more documents delineated within the GLS using end of document (EOD) words, an EOD word comprising a designator marking a boundary between two documents;

separating words of a received query having an integer value N words into an active set and a non-active set, the active set comprising an integer value M words of the received query that are left-most occurring with the GLS, the integer value M being less than the integer value N; and traversing the GLS by applying geometric constraints to the active set to determine if M words of the received query are comprised within one or more documents, at least one of the traversals comprising:

detecting an occurrence of a right EOD word of a current document occurring within the GLS before a location of a right-most word of the active set within the GLS, and determining the current document fails a geometric constraint based upon the occurrence, and for respective current words of the active set occurring before the right EOD word:

incrementing a current location of a current word to a next occurring location of the current word within the GLS after the right EOD word based upon the next occurring location occurring before a left-most word of the non-active set within the GLS, otherwise substituting the current word with the left-most word within the non-active set.

2. The method of claim 1, comprising:
updating the active set and the non-active set.

3. The method of claim 2, comprising:
updating the geometric constraints to apply to the updated active set.

4. The method of claim 1, the non-active set comprising N minus M words.

5. The method of claim 1, the geometric constraints comprising a constraint that words within the active set are located to the right of a left EOD word of a document and are located to the left of a right EOD word of the document.

6. The method of claim 1, the geometric constraints applied sequentially to words within the active set in a descending order sorted according to respective locations of the words within the GLS, thereby applying geometric constraints to words within the active set based on statistical commonality.

7. The method of claim 1, comprising utilizing prior knowledge of the received query when traversing the GLS.

8. The method of claim 1, the one or more documents comprising images.

9. The method of claim 1, the assigning comprising:
assigning a word of a document to a location within the GLS corresponding to a first appearance of the word within an inverted index.

10. The method of claim 1, comprising:
identifying one or more documents comprising M words within the active set based upon traversing the GLS.

11. A system configured to provide an M-out-of-N partial matching search, comprising:
a storage location comprising:
  an index file comprising words, a word associated with a hit-list denoting one or more locations of the word within one or more documents; and
  a one-dimensional global location space (GLS) comprising respective occurrences of words from the index file arranged in continuous locations, wherein the words are from one or more documents indexed for searching, the one or more documents delineated within the GLS using end of document (EOD) words, an EOD word comprising a designator marking a boundary between two documents; and
a dynamic program configured to:
  separate words of a received query having an integer value N words into an active set and a non-active set, the active set comprising an integer value M words of the received query that are left-most occurring within the GLS, the integer value M being less than the integer value N; and
  traverse the GLS by applying geometric constraints to the active set to determine if M words of the received query are comprised within one or more documents, at least one of the traversals comprising:
    detecting an occurrence of a right EOD word of a current document occurring within the GLS before a location of a right-most word of the active set within the GLS, and determining the current document fails a geometric constraint based upon the occurrence, and for respective current words of the active set occurring before the right EOD word:
      increment a current location of a current word to a next occurring location of the current word within the GLS after the right EOD word based upon the next occurring location occurring before a left-most word of the non-active set within the GLS, otherwise substitute the current word with the left-most word within the non-active set.

12. The system of claim 11, the dynamic program configured to:
update the active set and the non-active set.

13. The system of claim 12, the dynamic program configured to:
update the geometric constraints to apply to the updated active set.

14. The system of claim 11, the non-active set comprising N minus M words.

15. The system of claim 11, the geometric constraints comprising 2M geometric constraints.

16. The system of claim 11, the dynamic program configured to:
identify one or more documents comprising M words within the active set based upon the traversal of the GLS.

17. A computer-readable storage medium comprising instructions for performing a method for providing an efficient M-out-of-N partial matching search, the method comprising:
initializing a global location space (GLS) by assigning respective occurrences of words to continuous locations of a one-dimensional array comprised within the GLS, wherein the words are from one or more documents indexed for searching, the one or more documents delineated within the GLS using end of document (EOD) words, an EOD word comprising a designator marking a boundary between two documents;
separating words of a received query having an integer value N words into an active set and a non-active set, the active set comprising an integer value M words of the received query that are left-most occurring with the GLS, the integer value M being less than the integer value N; and
traversing the GLS by applying geometric constraints to the active set to determine if M words of the received query are comprised within one or more documents, at least one of the traversal comprising:
  detecting an occurrence of a right EOD word of a current document occurring within the GLS before a location of a right-most word of the active set within the GLS, and determining the current document fails a geometric constraint based upon the occurrence, and for respective current words of the active set occurring before the right EOD word:
    incrementing a current location of a current word to a next occurring location of the current word within the GLS after the right EOD word based upon the next occurring location occurring before a left-most word of the non-active set within the GLS, otherwise substituting the current word with the left-most word within the non-active set.

18. The computer-readable storage medium of claim 17, the non-active set comprising N minus M words.

19. The computer-readable storage medium of claim 17, the assigning comprising:
   assigning a word of a document to a location within the GLS corresponding to a first appearance of the word within an inverted index.

20. The computer-readable storage medium of claim 17, comprising:
   identifying one or more documents comprising M words within the active set based upon traversing the GLS.

* * * * *